March 28, 1933. H. A. PLATT 1,903,132
ADJUSTABLE SUN VISOR
Filed Jan. 31, 1930 2 Sheets-Sheet 1

Inventor
Harry A. Platt
By Blackmore, Spencer & Hult
Attorneys

March 28, 1933. H. A. PLATT 1,903,132
ADJUSTABLE SUN VISOR
Filed Jan. 31, 1930 2 Sheets-Sheet 2
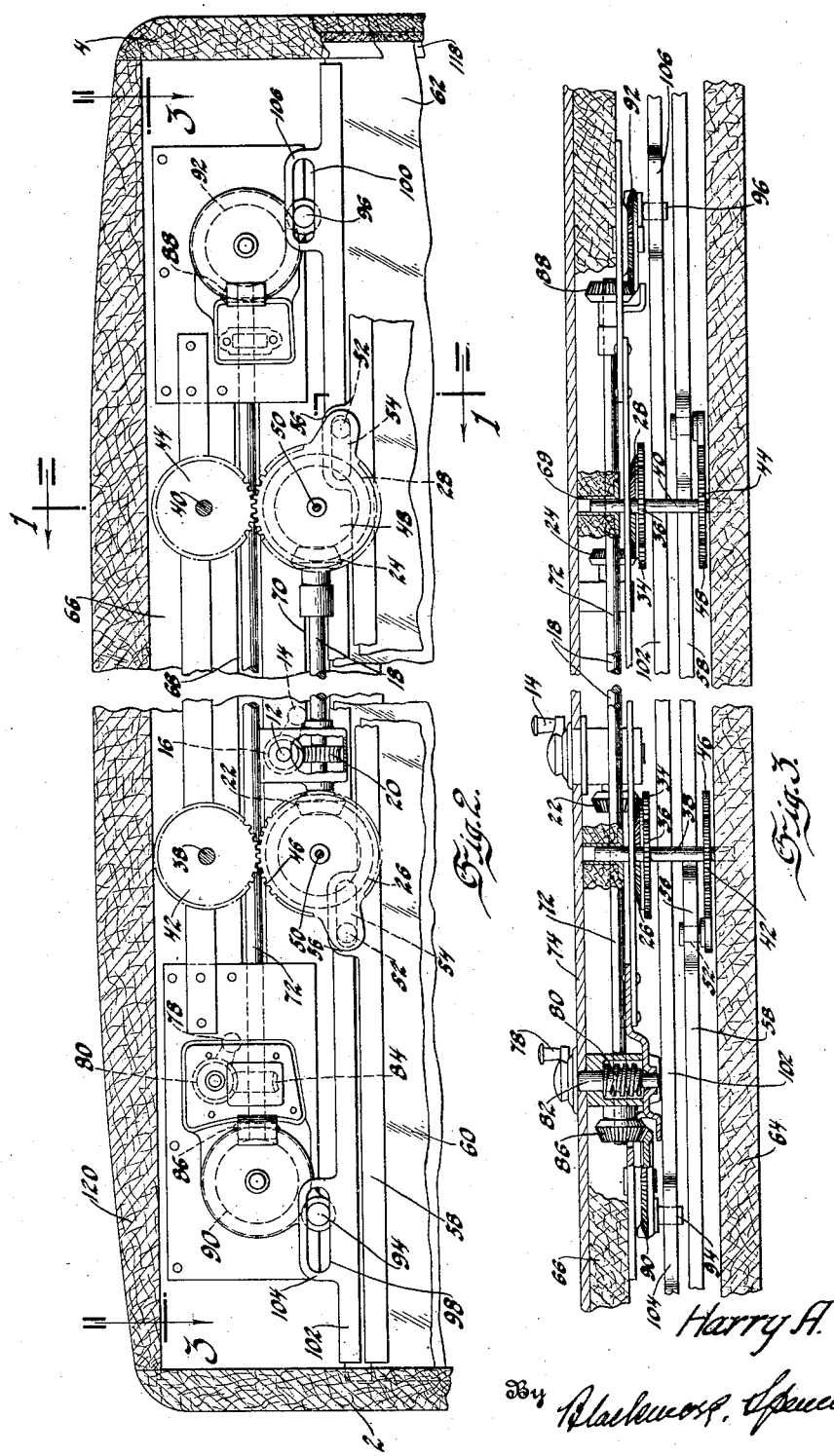

Patented Mar. 28, 1933

1,903,132

UNITED STATES PATENT OFFICE

HARRY A. PLATT, OF DETROIT, MICHIGAN, ASSIGNOR TO GENERAL MOTORS CORPORATION, OF DETROIT, MICHIGAN, A CORPORATION OF DELAWARE

ADJUSTABLE SUN VISOR

Application filed January 31, 1930. Serial No. 424,844.

This invention aims to provide advantageous means for the support of a glare-excluding plate in a favorable position relatively to a windshield, or the like; and preferred embodiments of this invention may provide for a combinational use of a windshield, preferably of the general type disclosed in the Simpson Patent 1,604,103, granted October, 1926, and a sun visor which is provided with special manipulating means. The means last referred to may somewhat resemble the means employed to elevate and depress the so-called VV windshield, as now manufactured under the Simpson patent referred to.

It should be understood that the principles of this invention would be applicable to the support of a mirror, or to the support of a visor element so locally or partially coated or otherwise conditioned as to serve both the functions of a mirror and those of a sun visor or glare-excluding element; but all forms of the invention preferably employ transparent or translucent or reflecting plates which extend, in an inclined or a vertical plane or planes, throughout practically the entire width between vertical posts,—substantially such as are now provided for the support of automobile tops and/or windshields. When constructed as above indicated, the visor may be adapted partially or completely to disappear into a pocket provided in a hollow header organization to receive the same and extending between the mentioned posts.

As indicated, the novel mechanism employed for the manipulation of the mentioned shell or visor is preferably suitable for conjoint use with mechanism for elevating and depressing a main windshield plate; and it is accordingly an object of this invention, which may involve the use of no additional exposed parts except an operating handle, to provide means for transmitting motion from such an operating handle to a visor plate which is disposed forwardly and externally of a main or windshield plate,—the transmitting train preferably including a pair of short shafts which extend forwardly to bridge, at a high level, the mentioned pocket.

In the drawings:

Fig. 2 is a vertical sectional view, taken at right angles to Fig. 1 and on a smaller scale,— in substantially the plane suggested by the line 2—2 of Fig. 1.

Fig. 3 is a horizontal sectional view, taken substantially as indicated by the line 3—3 of Fig. 2.

Figures 1, 4, 5:
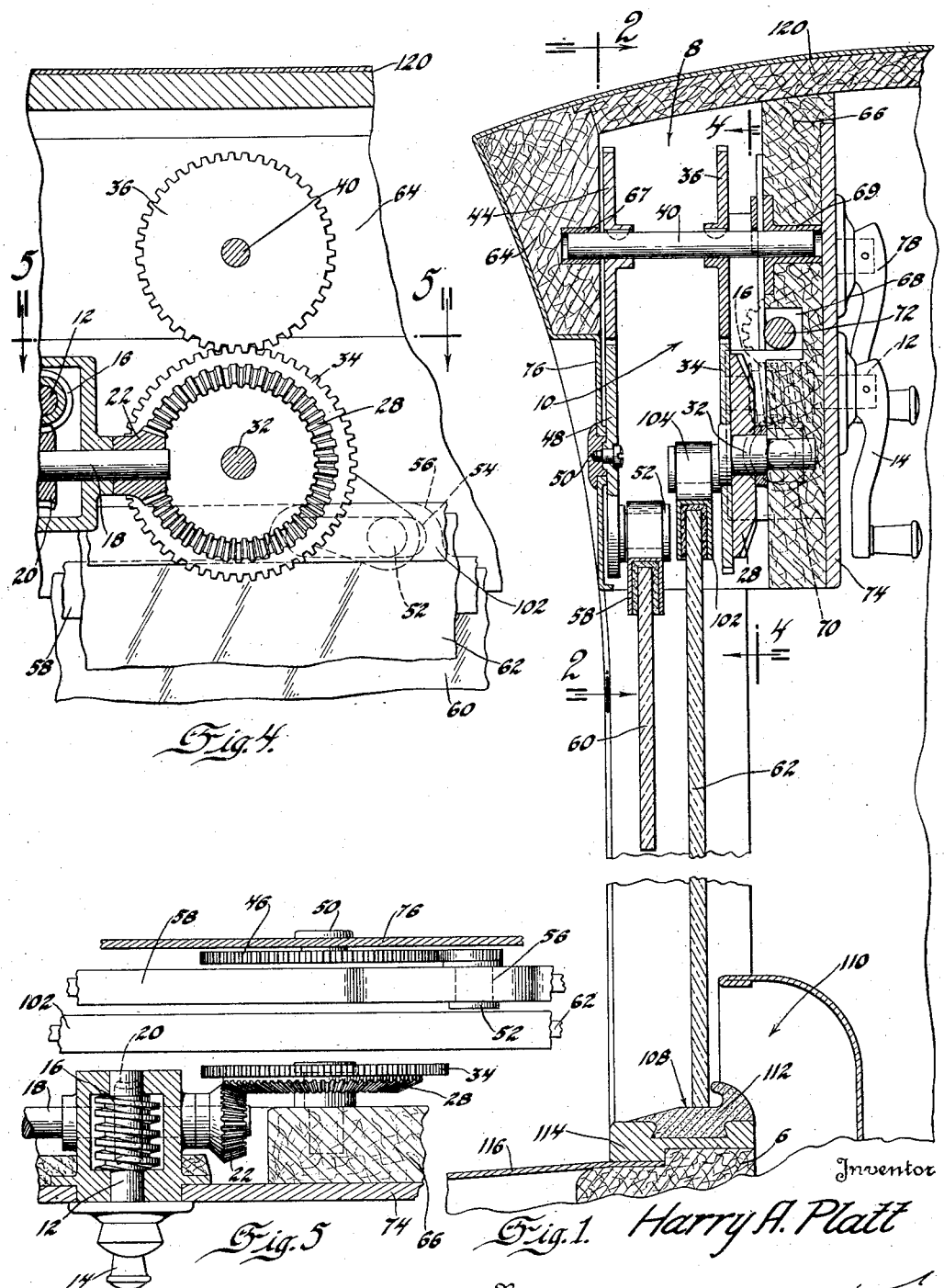
Fig. 1 is a vertical sectional view, taken substantially as indicated by the line 1—1 of Fig. 2.
Fig. 4 is a forward-looking detail view, taken substantially as indicated by the line 4—4 of Fig. 1.
Fig. 5 is a horizontal sectional view, taken substantially as indicated by the line 5—5 of Fig. 4.

Referring to the drawings, posts 2 and 4 are shown as extending between sill 6 and a header organization 8, providing a pocket 10; and the entire novel visor and operating means are capable of being housed in said pocket, except as to an operating handle 14, positioned for convenient manipulation by a driver or other occupant and from the interior of the vehicle to which the described parts pertain.

To give a general conception of a preferred construction: a shaft 12 carrying the handle 14 and a worm 16, rotates a shaft 18 through a worm 20. The shaft 18 has the bevel gears 22 and 24 on its ends which mesh with bevel gears 26 and 28, mounted on shafts 32. The bevel gears 26 and 28 each have rigid or integral therewith the spur gears 34, meshing with the gears 36, mounted on shafts 38 and 40. Gears 42 and 44 upon the shafts 38 and 40, mesh with gears 46 and 48, journalled as at 50 in the header 8 and carrying each a cam pin 52 which is adapted to so enter a slot 54 in a visor plate or in a lug 56 shown as so carried by an attachment upon a channel member 58 as to elevate or depress a visor element 60.

This is shown as extending between the mentioned posts 2 and 4; and it will be seen that this construction provides for manipulation of said visor without interfering with the manipulation of a main windshield plate 62, disposed inwardly of the visor plate 60 and substantially parallel therewith.

The header organization 8 is shown as comprising substantially parallel wooden or other frame elements 64 and 66, adapted to provide a pocket or space to receive bearings 67 and 69 for the shaft 40; and the header element 66 may be provided with longitudinal channels 68 and 70, suitable to receive the horizontal shafts 18 and 72.

It will be seen that this symmetric arrangement obviates any danger of a skewing or binding of the visor plate 60 during elevation or depression thereof; that the mentioned parts may be all concealed by means such as header elements 64 and 66 and an inner plate 74 and an outward or forward plate 76—the latter being optionally employed to support the bearings 50 for the cam pin-carrying gears 46 and 48; and the windshield 62 may be independently manipulated.

For example, to manipulate the windshield 62, a crank or handle 78 may rotate, through a worm 80 upon its shaft 82, a worm gear 84 upon the mentioned shaft 72, terminally carrying beveled gears 86 and 88; and these gears may, in turn, engage larger beveled gears 90 and 92 carrying cam pins 94 and 96, the latter being shown as received in the slots 98 and 100, provided in the lugs 104 and 106 extending upwardly from an attachment channel element 102, in which said plate 62 is carried.

The general mode of operation of the described sun visor mechanism, and its relationship to a preferred type of windshield manipulating mechanism have been fully indicated in connection with a description thereof; but attention may be again called to the fact that the described organization provides for substantially complete withdrawal or concealment of the visor at will, by manipulation of the handle 14 or its equivalent; and the described organization completely avoids interference with or limitation of the manipulation of the windshield plate by usual means such as the additional handle 78.

The interposition of the shaft 18, oppositely to rotate cam-carrying gears 46 and 48, permits a wide spacing and light operation of said gears,—marking a distinct advance in windshield manipulation; but one of the symmetrical pairs of cam-carrying gears should be spaced more widely than the other pair, when two pairs are used; and the cam pins 52 are oppositely so movable, with gears 46 and 48 as to obviate skewing of the visor plate lifted thereby. The irreversible character of the worm drive provides a self-locking construction; and the shafts 38 and 40 whether directly or indirectly rotated by suitable cranks or other levers, are preferably placed so high in the described header pocket as to permit the visor plate upwardly to disappear therein and to permit the lower edge of the windshield plate 62, if said plate is used, to be lifted to approximately its usual level above the upper edge 108 of any foot-ventilating conduit 110 that may be used therewith.

Plate 62 is shown as engaging a drip guard element 112, which may be formed of a special composition and may have a dove-tailed connection with a connecting strip 114, shaped favorably to the retention of a cowl element 116; and, in preference to otherwise providing suitable guidance therefor, a full-width visor plate may advantageously extend, at its respective ends, into suitable guides or slots. These may be similar to and may extend parallel with any usual guides or slots 118, for the reception of the ends of the windshield plate 62, in posts 2 and 4; but it will be understood that the novel visor, or its equivalent, may be used with or without a windshield of the described character; and that the specific form of the mentioned structural elements and the mode of associating the same with additional structural elements, such as roof or other frame elements 120, at the top of the described header and also the configuration and mode of support of any flanged or other bearing or housing elements, etc., may be regarded as comparatively immaterial to, or as subordinate features of, the present invention.

Although the foregoing has included complete details of but one embodiment of the present invention, it should be understood not only that various features thereof may be independently used but also that numerous modifications, additional to those incidentally suggested herein, might easily be devised by workers familiar with the foregoing,—all without departure from the scope of the present invention.

I claim:

1. In an automotive vehicle: a stationary header organization supported by posts and providing a pocket; a wind-shield plate slidable relatively to said pocket to vary an opening therebelow; a visor plate movable to and from said pocket; and positioning means for each of said plates, including separate handles accessible from within said vehicle and mechanical trains housed within said pocket and extending from said handles to said plates,—said plates being of substantially equal length and provided with substantially parallel guides carried by said posts; and one of said trains including a shaft which extends across said pocket above the range of movement of said plates.

2. In an automotive vehicle: a stationary header organization supported by posts and providing a pocket; wind-shield plate slidable relatively to said pocket to vary an opening therebelow; a visor plate movable to and from said pocket; and positioning means for each of said plates, including separate handles accessible from within said vehicle and mechanical trains housed within said pocket and extending from said handles to said plates,—said plates being of substantially equal length and provided with substantially parallel guides carried by said posts; and one of said trains including a pair of short and elevated forwardly-extending shafts, separate cam-carrying gears, and means for rotating said gears from said shafts.

3. In an automotive vehicle: a stationary header at the vehicle top providing a pocket, a wind-shield plate slidable relatively thereto; a visor plate, movable substantially parallel with said wind-shield plate; and positioning means for both of said plates,—said positioning means including, in each case, a handle, a worm rotatable thereby, a worm gear engaged by said worm, a substantially horizontal shaft extending longitudinally of said pocket, cams engaging cooperating cam slots to move the adjacent plate, and means for transmitting corresponding opposite movements from said shaft to said cams; both of said trains being housed in said pocket and one of said trains including means for bridging said pocket above the upward limit of movement of said plates.

In testimony whereof I affix my signature.

HARRY A. PLATT.